A. W. WADERLOW.
COLLAPSIBLE STOOL.
APPLICATION FILED JULY 5, 1919.
1,365,873. Patented Jan. 18, 1921.
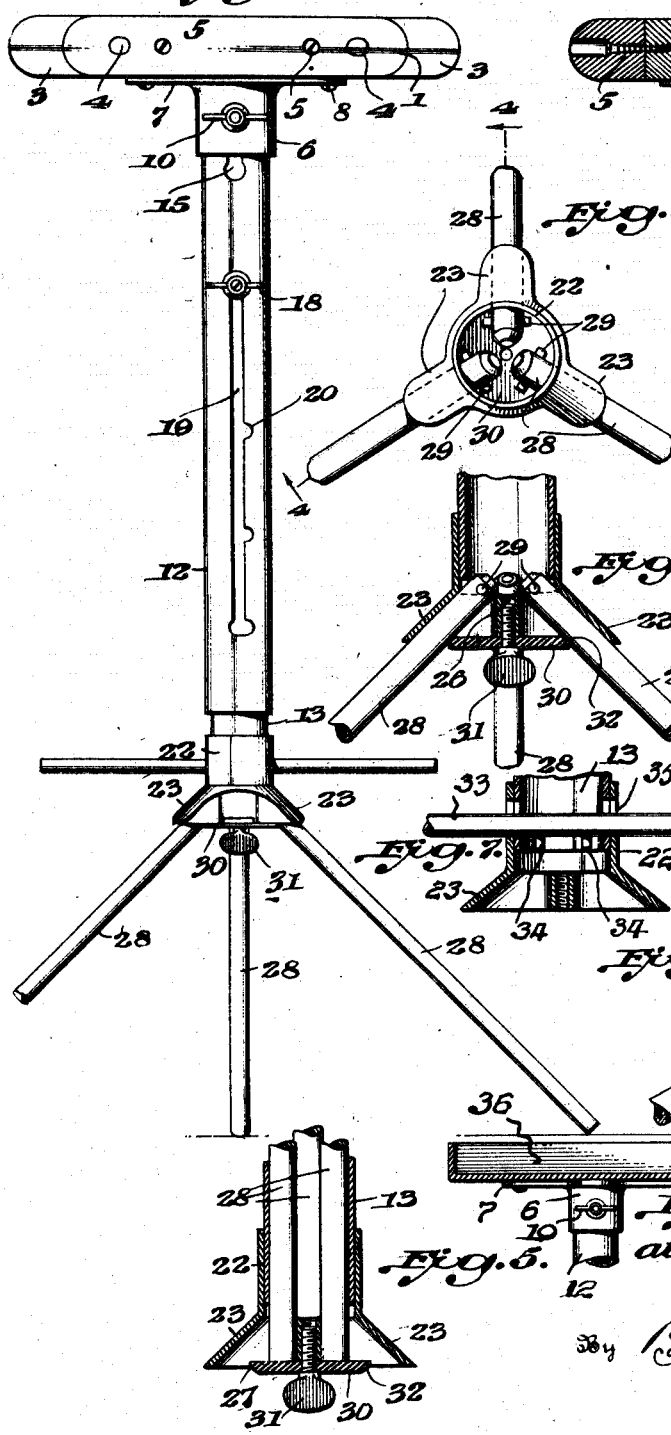
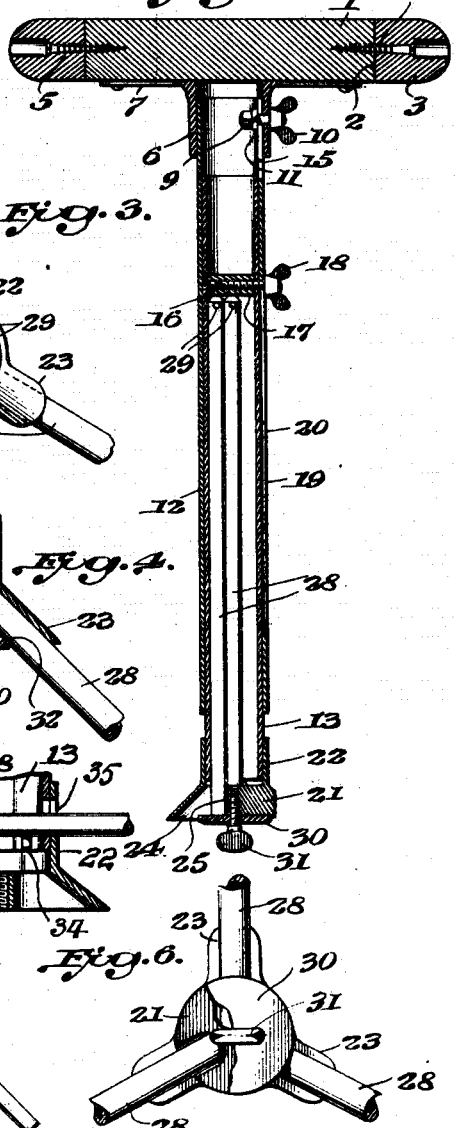
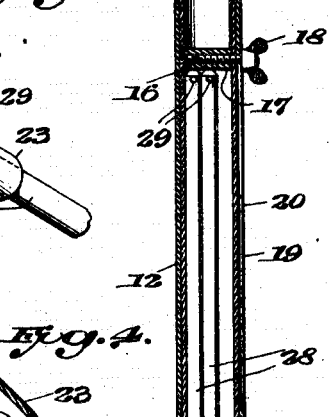
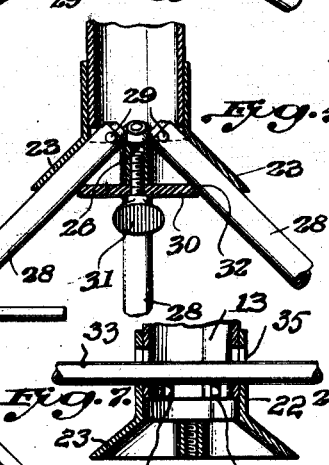
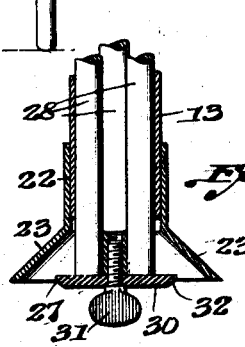
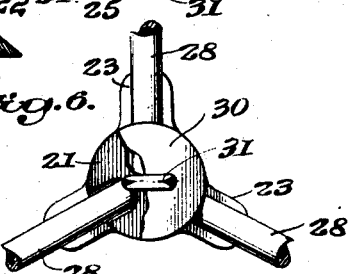
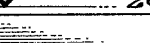
Inventor
Alexander W. Waderlow
By [signature]
Attorneys

UNITED STATES PATENT OFFICE.

ALEXANDER W. WADERLOW, OF DETROIT, MICHIGAN.

COLLAPSIBLE STOOL.

1,365,873.                Specification of Letters Patent.        Patented Jan. 18, 1921.

Application filed July 5, 1919. Serial No. 308,789.

*To all whom it may concern:*

Be it known that I, ALEXANDER W. WADERLOW, a subject of the King of Great Britain, residing at Detroit, in the county of Wayne and State of Michigan, have invented certain new and useful Improvements in Collapsible Stools, of which the following is a specification, reference being had therein to the accompanying drawings.

The primary object of my invention is to provide a foldable or collapsible stool that may be advantageously used by machine workers, mechanics and other artisans as a seat, the stool being constructed so that it will withstand rough usage about a machine shop and at the same time permit of the user folding or collapsing the stool whereby it may be placed in a tool box, kit or conveniently carried.

Another object of my invention is to provide a stool of the above character embodying a tripod base, a telescopic pedestal, and a sectional detachable seat, these elements permitting of the stool being adjusted for a desired height and collapsed to reduce its longitudinal dimension for packing or carrying purposes.

A further object of my invention is to accomplish the above result by a simple and inexpensive mechanical construction which will be hereinafter specifically described and then claimed, and reference will now be had to the drawings, wherein—

Figure 1 is a side elevation of a portion of the stool;

Fig. 2 is a vertical sectional view of the same showing the legs of the tripod base in a collapsed position;

Fig. 3 is a plan of the tripod base;

Fig. 4 is a vertical sectional view of the same taken on the line 4—4 of Fig. 3;

Fig. 5 is an enlarged vertical sectional view of the tripod base showing the manner of retaining the legs in a collapsed position;

Fig. 6 is a bottom plan of the same with the legs in an active position;

Fig. 7 is a detail sectional view showing a foot rest connection, and

Fig. 8 is a similar view of a tool tray that may be substituted for the seat.

In the drawing, the reference numeral 1 denotes a seat having diametrically opposed flat facets or walls 2 against which are detachable peripheral seat sections 3 coöperating with the center piece in forming a circular seat having rounded peripheral edges. The detachable seat sections 3 may be correctly positioned by dowel pins 4 which enter the walls 2 of the seat center piece 1 and to fix these detachable sections relative to the seat center piece, screws 5 may be employed, said screws having the heads or outer ends thereof countersunk in the detachable seat sections 3, as clearly shown in Fig. 2. By removing the screw 5, the seat sections 3 may be detached, thereby reducing the width of the seat center piece 1 and permit of it being packed or carried in a tool box or kit.

Connected to the lower face of the seat 1 is a tubular socket 6 having a plurality of radially disposed arms 7 that may be connected to the seat 1 by screws 8 or other fastening means. One of the walls of the tubular socket 6 is provided with a screw bolt 9 having a winged thumb nut 10 on the outer end thereof and a spring washer 11 on the inner end thereof, and said bolt and nut constitute means for detachably holding a telescopic pedestal comprising an outer tube 12 and an inner tube 13, said outer tube telescoping the inner tube. The upper end of the outer tube 12 has a longitudinal slot 15 and the upper end of the outer tube may be placed in the socket 6 with the slot 15 providing clearance for the screw bolt 9 and by tightening said screw bolt, the spring washer 11 is brought against the inner wall of the tube 12 to positively clamp said tube in engagement with the socket. The inner tube 13, contiguous to the inner end thereof, has a screw bolt 16 mounted in a block 17 set in the tube 13. Adjustable on the outer end of the screw 16 is a winged thumb 18 prevented from becoming accidentally displaced by the head of said screw, and said screw extends through a longitudinal slot 19 in the outer tube 12. The slot 19 has lateral branches or sockets 20 any of which may receive the screw 16 so that the outer and inner pedestal tubes may be adjusted for a desired height. With the winged thumb nut 18 tightened against the outer tube 12, the inner tube 13 is firmly held.

Mounted on the lower end of the inner pedestal tube 13 is a tripod base comprising a head 21 having a sleeve 22 fitted on the lower end of the tube 13. The head 21 has a plurality of radially disposed supports 23, preferably three in number and these supports are formed with openings communicating with the inner tube 13. Each opening has an angularly disposed wall 24 and a side wall 25, as best shown in Fig. 2. Between the walls 25 is a screw opening 26 and the lower face of the head 21 is cut away to provide an angular recess 27.

Slidable in the head 21 and the supports 23 thereof are legs 28 which have the inner ends thereof beveled and provided with transverse pins 29, as best shown in Figs. 3 and 4. The legs 28 when extending into the tube 13 engage the straight walls 25 of the head 21 and when said legs extend out of the head 21, in an active position, said legs engage the inclined walls 24 of the support 23. The transverse pins 29 at the inner ends of the legs 28 prevent the legs from being completely removed and constitute fulcrums on the heads 21 for swinging the legs out of alinement with the pedestal into position at an angle thereto, so that the legs will constitute a tripod at the lower end of the pedestal.

To hold the legs 28 either in an active or inactive position a circular retaining member 30 is employed and mounted in the recess 27 with a thumb screw 31 entering the screw opening 26 and holding the retaining member in place. The retaining member 30, as shown in Fig. 2, engages the outer ends of the legs 28 and maintains said legs against the straight walls 25 of the head 21 and the inner walls of the tube 13. By removing the retaining member 30 the legs may be withdrawn and placed in tripod formation. The retaining member may then be inverted, placed in the recess 27 and the screw 31 placed in the head 21 to hold the retaining member in position. The retaining member has a beveled edge 32 which will engage the leg 28, when said retaining member is inverted, as shown in Fig. 4, and thus hold the legs against the walls 24 of the supports 23, preventing accidental collapse of the tripod legs. It is not necessary to invert the retaining member 30, but is optional with the user.

The stool above the tripod thereof, may be provided with a transverse foot rest 33, which may be advantageously made of a rod and intermediate its ends provided with studs 34. The inner tube 13 and the sleeve 22 can be provided with inverted key-hole shaped openings 35, so that the rod 33 and its stud may be placed transversely of the pedestal. After the studs 34 have entered the lower end of the tube 13 the rod 33 may be partially rotated so that the studs 34 will extend downwardly, as shown in Fig. 7, and prevent accidental displacement of the foot rest. The foot rest may be removed when it is desired to collapse the stool.

It is also possible to substitute a tray or tool container 36 for the sectional seat 1, so that tools, instruments, and other matter may be conveniently supported adjacent a machine or in proximity to a piece of work so that the tools and instruments can be easily obtained by the artisan operating on the piece of work. The tray may be attached to the upper end of the pedestal similar to the seat.

From the forgoing it will be observed that the tripod legs can be housed within the inner tube of the pedestal, the pedestal telescoped to reduce its length and the seat removed, thus permitting the stool being easily carried in a tool box or kit. The seat may be made of wood and the remaining parts of metal that will not corrode and while in the drawing there is illustrated a preferred embodiment of my invention it is to be understood that the structural elements are susceptible to such variations and modifications as fall within the scope of the appended claims.

What I claim is:—

1. In a stool having a seat and pedestal, a head carried by said pedestal and provided with angularly disposed supports, legs adapted to be housed in the pedestal and lowered through said head and held in the supports thereof, and a detachable retaining member carried by said head adapted to engage the outer ends of said legs to retain said legs in said pedestal and engage the inner ends of said legs to retain said legs in the supports of said head.

2. In a stool, the combination with a seat having a pedestal, of a head on said pedestal having angularly disposed supports, legs slidable in and out of said pedestal and adapted to be held in engagement with said head and in the supports thereof, means carried by the inner ends of said legs adapted to engage said head and limit the outward movement thereof, and reversible means detachably connected to said head and adapted in one position to engage the outer ends of said legs and maintain said legs in said pedestal and in an inverted position engage the inner ends of said legs and maintain said legs in the supports of said head and in tripod formation.

In testimony whereof I affix my signature in the presence of two witnesses.

ALEXANDER W. WADERLOW.

Witnesses:
KARL H. BUTLER,
ANNA M. DORR.